(12) United States Patent
Bonfiglio

(10) Patent No.: US 6,606,822 B2
(45) Date of Patent: Aug. 19, 2003

(54) AQUEOUS BASE INOCULANT COMPOSITION FOR SEEDS, COATED SEEDS AND METHOD FOR STORING THE COMPOSITION

(75) Inventor: Carlos Héctor Bonfiglio, Buenos Aires (AR)

(73) Assignee: Sintesis Quimica S.A.I.C., Buenos Aires (AR)

(*) Notice: Subject to any disclaimer, the term of this patent is extended or adjusted under 35 U.S.C. 154(b) by 0 days.

(21) Appl. No.: 09/930,465

(22) Filed: Aug. 16, 2001

(65) Prior Publication Data

US 2002/0050096 A1 May 2, 2002

(30) Foreign Application Priority Data

Sep. 12, 2000 (AR) .................................. P000104788

(51) Int. Cl.⁷ .................................. A01C 1/06
(52) U.S. Cl. .................................. 47/57.6; 504/100
(58) Field of Search .................. 47/57.6; 435/252.2; 800/312; 504/100

(56) References Cited

U.S. PATENT DOCUMENTS

| | | | | |
|---|---|---|---|---|
| 2,989,821 A | * | 6/1961 | Blondheim et al. | 47/57.6 |
| 4,161,397 A | * | 7/1979 | Bellet et al. | 435/260 |
| 5,586,411 A | * | 12/1996 | Gleddie et al. | 206/527 |
| 5,797,976 A | * | 8/1998 | Yamashita | 71/11 |
| 5,994,265 A | * | 11/1999 | Barclay et al. | 504/100 |
| 2002/0050096 A1 | * | 5/2002 | Bonfiglio | 47/57.6 |

OTHER PUBLICATIONS

Young et al., Phytochemistry, vol. 19 (1980) pp. 159–160.
El–Zamik et al., Soil Biol. Biochem., vol. 19, No. 2 (1987) pp. 207–209.
d'Arcy–Lameta, Plant and Soil, vol. 92 (1986) pp. 113–123.
Ali et al., Soil Biol. Biochem, vol. 22, No. 7 (1990) pp. 973–976.
Bowen, Plant and Soil XV, No. 2 (1961) pp. 155–165.

* cited by examiner

Primary Examiner—Peter M. Poon
Assistant Examiner—Jeffrey L. Gellner
(74) Attorney, Agent, or Firm—Birch, Stewart, Kolasch & Birch, LLP

(57) ABSTRACT

An aqueous-based inoculant composition in liquid form for leguminous seeds that produces an immediate nodule formation and an increased nitrogen fixation, containing microorganisms of the Rhizobium or Bradyrhizobium genus, a molybdenum compound selected from alkali metal molybdates and a compound that neutralizes the seed exudates, which are toxic for the bacteria, selected from polymers of compounds presenting an amide, amine or imine moiety. The inoculant composition remains stable at room temperature, keeping the number of viable bacteria over long periods of time and ready to be used.

9 Claims, 2 Drawing Sheets

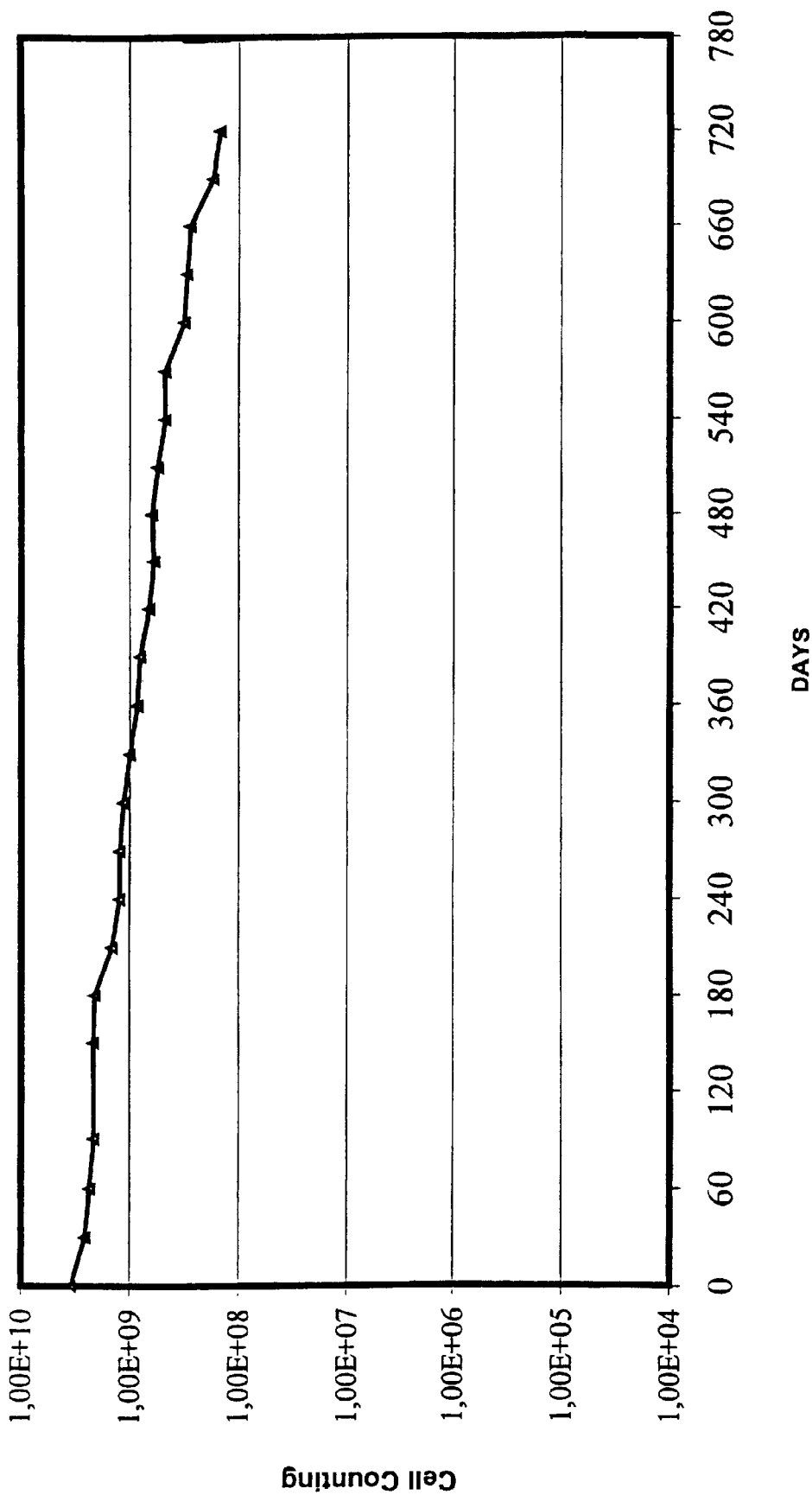

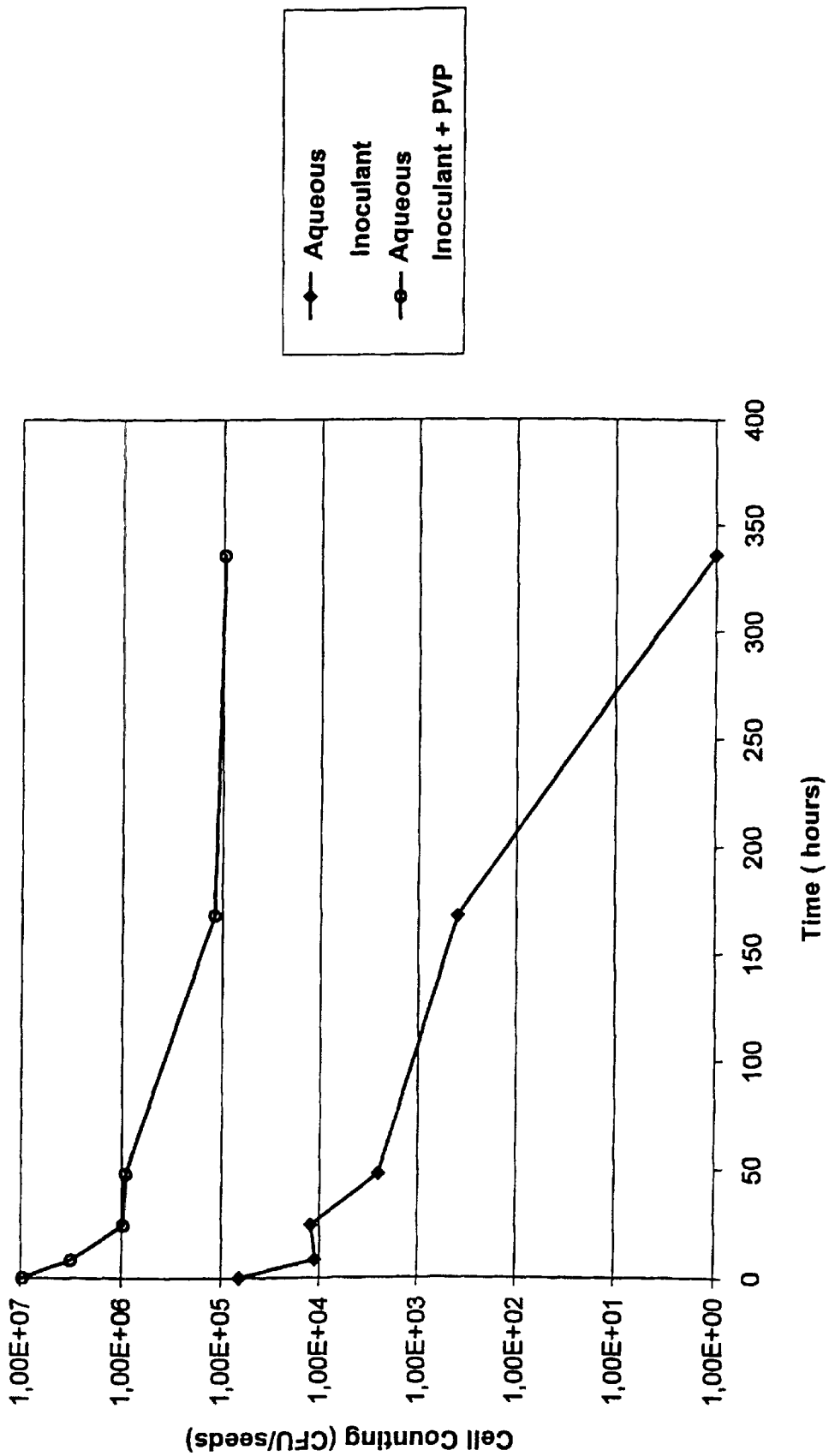

AQUEOUS BASE INOCULANT COMPOSITION FOR SEEDS, COATED SEEDS AND METHOD FOR STORING THE COMPOSITION

FIELD OF THE INVENTION

This invention refers to an aqueous base inoculant composition for seeds, particularly leguminosae, containing at least one species of nitrogen fixing microorganisms in plants, more particularly bacteria of Rhizobium or Bradyrhizobium genus, which provides the plants with increased nodulation capacity, and remains stable at room temperature, without decreasing the number of viable bacteria for extended periods of time.

BACKGROUND OF THE INVENTION

The symbiotic relation between leguminous plants and bacteria of Rhizobium genus is very well known. Leguminous plants form a large group of plants to which vegetables of economic importance as soybean, lucerne, peanut, peas, etc., belong. The bacteria of Rhizobium genus are able to infect the roots of the plants, as they permeate into the radicular hairs and colonize the root, producing those characteristic "nodules". As a result of this symbiotic relation, plants can turn gaseous nitrogen into organic compounds of nitrogen, by means of the process described as nitrogen fixation.

When seeds of leguminosae are sowed in an area which has not been previously cultivated, or that has remained uncultivated for some time, Rhizobium microorganisms will be probably scarce in the soil. In such cases, it is a frequent practice that the seeds be inoculated before sowing, to assure the desired nodulation. Leguminous plants are considerably benefited as atmospheric nitrogen fixing nodules form, obtaining improved results and higher protein content. Besides, in nitrogen-deficient soils, benefits are obtained since their original contents do not exhaust.

There are many species and strains different from Rhizobium bacteria. Thus, specific strains can be identified for each crop, which will not necessarily make an effective nodulation in a different crop. Although most of the soils contain a natural rhizobial population, these wild strains are frequently ineffective for a desired nitrogen fixation. Therefore, the best way to assure an appropriate symbiosis with a certain crop is to inoculate either the seed or the soil, at the moment of the sowing, with bacteria of a selected rhizobian strain.

The well-known Rhizobium inoculant compositions contain the microbial strain together with an appropriate carrier medium.

Initially, inoculant compositions were used in agarized cultures and they were not very popular at that time as their practical use was very limited. Then, formulations with peat as carrier medium were used, which are still being used at present.

Coating seeds with an inoculant film is the most preferred method of inoculation. The inoculant is placed in intimate contact with the seeds in order to assure a quick formation of nodules in plants after germination. This can be achieved by means of the application of a powder composition of bacteria in dormant state, in a mixture with a powder carrier such as kaolin, peat, etc. Although a stable product is obtained, the powder does not completely stick onto the seeds, thus resulting in the loss of powder and therefore in the decrease of bacterial concentration in the coating, besides the problems in the sowing machines, such as blockage of pipes and other conducts which transport the seeds towards the soil.

Further on, oil-base inoculants appeared, which brought important practical advantages for their application, as compared to powder formulations, besides allowing the preparation of mixed formulations of inoculant and fungicides. However, and disadvantageously, in order to have a good survival of the bacteria in this type of formulations, it is necessary to store them at about 0° C., which increases costs, since it requires to have cooling means, and maintain the cooling chain until the moment they are eventually used.

Recently, aqueous base inoculants were developed, which have the same practical use as the oil-based inoculants, an important advantage over them is that aqueous base inoculant can be stored at room temperature for long periods of time, without decreasing the number of viable bacteria.

It is known that the process of nitrogen fixation is activated by a nitrogenase enzyme which contains molybdenum (Mo). If molybdenum could be spread over the surface of the seed at the moment of germination, inoculating bacteria would achieve a quick nodulation and an immediate air nitrogen fixation, as well.

An important additional factor to keep in mind is the release of toxic compounds, usually called exudates, by the seeds. These exudates possess an inhibitory effect on bacteria, mushrooms, yeasts, etc. These effects may be also found in the leguminous seeds. The most important agents for toxic response were identified as condensed tannins in white clover (*trifolium repens* L.) for Rhizobium (Young & Paterson, 1980); for four strains of *Rhizobium trifolii* (*T. Subterraneum* L., *T. Visiculosum* Savi and *T. Pratense* L.) it is probably involved a reaction between the tannic acid of the seed and the iron of the medium (The Zamik & Wright, 1987); D'Arcy-Lameta A. (*Study of soybean and lentil root exudates; Identification of some polyphenolic compounds. Relation with planlet physiology. Plant and Soil*, 92, 113–123, 1986) have identified some polyphenolic compounds in diffusates of lentil seeds (*Lens culinaris*) and of soybean seeds (*Glycine max* L.). Others identified exudates were Myricetina (3, 5, 3', 4', 5'haexahidroflavone), desoxy-5flavones, isoflavonoids (Ali, F. S. and You Loymnachan, *Inhibition of Bradyrhizobium japonicum by Diffusates from soybean seeds. Soil Biol. Biochem*, 22(7), 973–976, 1990).

At the moment of inoculation, the inoculated seeds of leguminosae begin interacting with the bacteria over their surface (Rhizobium and Bradyrhizobium), thus producing a progressive death of said microorganisms (Bowden, G. D., *The toxicity of legume seeds diffusate towards Rhizobia and other bacteria. Plant and Soil*, 15 (2), 155–165, 1961).

In order to avoid these inconveniences, these exudates, such as the tannins, must be, somehow, neutralized by another compound having basic functions, which is inert for the beneficial bacteria and the seed/plant.

SUMMARY OF THE INVENTION

It has been found that the novel combination of a molybdenum compound and a compound that neutralizes toxic exudates of the seed in an aqueous base provides an inoculating composition which produces an immediate formation of nodules in the crown of the root of the germinated plants, and consequently nitrogen fixation, with which a strong plant with a high-protein performance is obtained from the beginning. The novel combination of a neutralizer compound of these toxic exudates with a compound of Mo on the surface of the seed, provides the root of the germinated plant with a high concentration of viable rhizobial bacteria and an availability of Mo independently of the characteristics of the soil. This novel combination provides performance results of plants inoculated with this composition, which are advantageously differed from those inoculated with the traditional formulations.

This invention provides an inoculating composition in an aqueous base for seeds which comprises at least a specie of microorganism which has a beneficial effect on plants, a Molybdenum compound and a polymer selected from those which have an amide, amine or imine moiety and appropriate exicipients.

Plants are leguminosae, with the preferable selected microorganisms being those of the Rhizobium or Bradyrhizobium genus.

A preferred polymer to be employed in this invention is polyvinyl pirrolidone (PVP), preferably in a concentration of about 0.2 to 5% weight/weight of the composition.

Preferred Molybdenum compounds are inorganic salts, preferably alkali metal salts, such as sodium molybdate and potassium molybdate. A more preferred salt is potassium molybdate, in a concentration ranging between 0.01 and 2.00% of the composition. More preferably, molybdenum compound is present in a concentration of 0.20%.

Furthermore, the invention provides a seed having a coating that comprises at least one species of microorganism having a beneficial effect on plants, a Mo compound and a polymer selected among those presenting an amide, amine or imine moiety.

The invention provides, also, a method for producing the immediate formation of nodules in the root of leguminous plants which comprises, coating the leguminous seeds with the above composition.

It is a further object of the invention to provide an inoculant liquid composition in an aqueous base, such as the one hereinabove described, that may be stored at room temperature for long time, while keeping the concentration of required viable bacterial for about two years.

DETAILED DESCRIPTION OF THE INVENTION

The invention is carried out using bacteria of the Rhizobium and Bradyrhizobium genus, which are capable of forming nodules in the roots of one or more species of leguminous plants. Preferred strains include *Bradyrhizobium japonicum, Rhizobium meliloti, Rhizobium leguminosarum biovar trifolii, Rhizobium leguminosarum biovar viceae* and *Rhizobium leguminosarum biovar phaseoli*.

The selection of Rhizobium and Bradyrhizobium strains effective for nitrogen fixation is a first necessary step for producing a high quality leguminous seed inoculant. Specificity of effectiveness is expressed as differences in action between species and differences among the species. Ecological factors should be also taken into account, such as competitive capacity for growing in the soil and in the rhizosphere, competitive ability for forming nodules and surviving in both, presence and absence of the plant. Other factors to be taken into account for selecting a microbial culture are tolerance to carrier means, tolerance to the substrate where it is applied and soil features.

After the desired rhiozobian strain is selected, it is cultured in a growth medium within a conventional fermenter. A suitable growth medium can be, for instance, an aqueous medium having saccharose, yeast autolysate, potassium phosphate, magnesium phosphate heptahydrate, calcium chloride and ferrous chloride. Fermentation is conducted preferably under shaking at about 30° C., till a high bacteria concentration is achieved.

For practicing the inventive inoculating composition, shares of the fresh bacterial culture having viable cells are mixed with equal shares of a sterilized suspension containing a Molybdenum compound and a polymer of the type presenting an amide, amine or imine moiety, such as polyvinyl pirrolidone. Viable cells concentration used is that necessary for obtaining a concentration in the final composition of the invention of about $5.0 \times 10^9$ bacteria/ml.

Polymers having an amidic nitrogen may be those of the type having sub-units carrying a 2-pirrolidone cycle, such as polyvinyl pirrolidone (PVP), polymers of alkylated vinyl pirrolidone, vinyl pirrolidone/vinyl acetate, styrene and substituted derivatives copolymers.

Preferably, PVP K-60 is used, such as Luviskol K60 by BASF. Also alkylated vinyl pirrolidone polymers may be used (Agrimer AL, furnished by International Speciality Products).

A suitable range for concentration of PVP and the like in the inoculating composition of present invention may be about 0.2 and 5% weight/weight. Preferably, a 3% weight/weight concentration is used.

The suspension also contains suitable adjuvants that provide for stability into the final composition. As such adjuvants, stabilizers may be used such as carboxymethyl cellulose, Arabic gum, sodium alginate and the like. Preferably, sodium alginate is used in concentration ranging from 0.1 to 1%, more preferably about 5%.

Preferably, also carboxymethyl cellulose is used in a concentration of about 0.5 and 2%, more preferably at about 1%.

Furthermore, the composition may contain nutrients or growth factors, such as sugars, aminoacids, proteins, salts, and the like. Additionally, the composition may contain osmoregulating agents, buffers, etc.

The inoculating composition of the invention may be stored at room temperature for about two years, the bacteria survival being guaranteed. The inventive aqueous composition may be stored in 250 ml plastic bags, which are sterilized before filling and sealed after filling.

Coating of seeds may be performed by spraying or simply mixing the aqueous composition with the seeds in a hopper or suitable container till a uniform seed coating is achieved. The inoculant/seed proportion can be about 150 cm$^3$ of the inoculating composition per 50 kilograms of seeds.

The invention has been generally described, and will be better understood when taken in reference to certain non limiting examples, which are included only for illustrative purposes.

EXAMPLE 1

Composition preparation

A single colony of *Bradyrhizobium japonicum* was sown in 100 ml of a culture medium (1% of saccharose, 0.05% of yeast autolysate, 0.022% of $K_2HPO_4$, 0.01% of $MgSO_4 \cdot 7H_2O$, 0.004% of $CaCl_2$ and 0.002% of $FeCl_3$ in water). It was incubated for 7 days at 30° C. in a rotary shaker at 120 rpm. The process was repeated bringing the 100 ml to 1 liter of fresh medium, and fermenting again.

1000 ml of the obtained culture were mixed with 1000 ml of a sterilized cooled solution, prepared from the dissolution in water of 0.5% of sodium alginate, 1% of carboxymethyl cellulose, 3 of polyvinyl pirrolidone and 0.2% of $K_2MoO_4$.

The mixture was packed under sterilized conditions in previously sterilized 250 cm³ plastic bags.

EXAMPLE 2

Viability of *Bradyrhizobium japonicum* in the Inoculating Composition

Samples of the composition prepared according to example 1 were stored for 720 days. Periodically, a sample was extracted and viability was determined, and cell counting performed, the initial composition concentration (time 0) being of $5.0 \times 10^9$ colony forming units/ml (cfu/ml). The results are shown in FIG. 1. Analysis of the curve obtained shows that the aqueous inoculating composition keeps viability of *B. japonicum* over $10^8$ cfu/ml for the $720^{th}$ day and is above $10^9$ cfu/ml for the first 300 days.

EXAMPLE 3

Viability of *Bradyrhizobium japonicum* Over Seeds

Two kilograms of soybean seeds were inoculated with the composition obtained according to the description in Example 1. The inoculation was made by mixing the inoculating composition with the seeds in a bag or waterproof canvas till an even coating over the seeds was achieved. A proportion of inoculant/seed similar to that determined for a field sowing was used, i.e. about 150 cm³ inoculant/50 kg of seeds. A similar process was used for a control lot, with an inoculant without PVP/Mo.

Periodically, 50 seeds from each formulation were taken each time, placed in a beaker whereto 100 ml of physiological solution was added. Through shaking, bacteria initially stuck to the seed cuticle passed onto the solution. Sowing was made and counting of bacteria was performed and number of bacteria per seeds (or colony forming units/seed, cfu/seed) was calculated. This process was repeated at 8, 24, 48, 168 and 336 hours. Essay temperature was 30° C. Results are shown in Table 1 below.

TABLE 1

| Hour | Inoculant without PVP/Mo (ufc/seed) | Inoculant with PVP/Mo (ufc/seed) |
| --- | --- | --- |
| 0 | $6.47 \times 10^4$ | $6.75 \times 10^4$ |
| 8 | $1.11 \times 10^4$ | $5.45 \times 10^4$ |
| 24 | $8.75 \times 10^3$ | $5.34 \times 10^4$ |
| 48 | $2.53 \times 10^3$ | $3.25 \times 10^4$ |
| 168 | $4.10 \times 10^2$ | $2.85 \times 10^4$ |
| 336 | — | $2.36 \times 10^4$ |

Results of this experience show that addition of PVP to the inoculant composition provides a higher number of viable bacteria present in the seed coating, which remained over $10^4$, even when the control group no longer provided viable bacteria (336 hours).

EXAMPLE 4

Viability of *Bradyrhizobium japonicum* Over Seeds

An essay was conducted following general process explained in Example 3, but from inocules with different bacteria concentrations. Results follow in Table 2 and FIG. 2.

TABLE 2

| | Inoculant without PVP/Mo | Inoculant with PVP/Mo |
| --- | --- | --- |
| Inoculant counting (bacteria/ml) | $2.0 \times 10^9$ | $4.79 \times 10^9$ |
| Seed counting (bacteria/seed) Hour | | |
| 0 | $6.47 \times 10^4$ | $9.49 \times 10^6$ |
| 8 | $1.11 \times 10^4$ | $6.42 \times 10^6$ |
| 24 | $1.23 \times 10^4$ | $9.65 \times 10^5$ |
| 48 | $2.53 \times 10^3$ | $9.14 \times 10^5$ |
| 168 | $4.00 \times 10^2$ | $1.10 \times 10^5$ |
| 336 | 1.00 | $1.05 \times 10^5$ |

From representation of data of FIG. 2, it is clearly seen that addition of PVP to the inoculating composition provides a longer persistence to the bacteria on the seed coating. In fact, drop in the counting is only by two orders of magnitude after 336 hours have elapsed, while using an inoculant without PVP, bacterial persistence is seriously affected, counting dropped by five orders of magnitude, just to 1 ufc/seed after 336 hours.

EXAMPLE 5

Nodulation Essays

Two kilograms of soybean seeds were inoculated with the composition obtained according to the description in Example 1. The inoculation was made by mixing the inoculating composition with the seeds in a bag or waterproof canvas till an even coating over the seeds was achieved. A proportion of inoculant/seed similar to that determined for a field sowing was used, i.e. about 150 cm³ inoculant/50 kg of seeds. A similar process was used for a control lot, with a similar inoculant, but without PVP/Mo.

150 beakers with sterilized vermiculite were prepared. Sowing was as follows: 50 beakers with an inoculant-free seed (negative reference) each, 50 beakers with a seed inoculated with a PVP/Mo-free, aqueous composition (control inoculant), and 50 beakers with a seed each, inoculated with the composition with PVP/Mo, prepared according to the description of Example 1.

Beakers were placed in a greenhouse under the following conditions:

Light: photoperiod 16/8; light source: ceiling covered with daylight tubes and Gro-Lux in a 2:1 ratio, placed at about 40-cm height from the beaker edges. Intensity on the edge of the beaker was about 4600 lux.

Maximum temperature 30° C., daily minimum temperature 25° C., night minimum temperature 20° C.

Minimum relative moisture: 65%.

Beakers were irrigated with a Jensen solution (2 ml of 10% $K_2HPO_4$, 5 ml of 4% $MgSO_4 \cdot 7H_2O$, 10 ml of 2% NaCl, 0.1 ml of 10% $FeCl_3$, 1 g of $CaHPO_4$ in 1 liter of sterilized distilled water, with a final pH of 6.9), diluted at 25%. After a week, some observations were made, little nodules were detected in the roots of the plants treated with the inoculant of PVP/Mo, while in the negative reference plants and in the control plants no nodule was detected.

A week later, all seeding were removed. The number of plants was recorded as well as the number of nodules per plant. The results are shown in Table 3 below.

TABLE 3

|  | Negative Reference | Aqueous Inoculant with PVP/MoO$_4^-$ | Aqueous Inoculant (control) |
| --- | --- | --- | --- |
| Inoculant counting (bacteria/ml) |  | $1.38 \times 10^{10}$ | $1.20 \times 10^{10}$ |
| Seed counting (bacteria/seed) |  | $1.54 \times 10^{5}$ | $1.36 \times 10^{6}$ |
| Total plants | 32 | 34 | 32 |
| Plants with nodules | 0 | 34 | 26 |
| % Plants with nodules | 0.00 | 100.00 | 81.25 |
| Plants with at least 3 nodules | 0 | 34 | 25 |
| % Plants with at least 3 nodules | 0.00 | 100.00 | 78.12 |
| Nodules/Plant | 0.00 | 10.03 | 5.64 |

Mention should be made that 100% of the plants treated with the inventive inoculant reach an average of 10.03 well-sized nodules per plant in the root crown. 81.25% of the plants treated with the control inoculant reach an average of 5.64 nodules, but of smaller size, per plant. Plants without inoculant coating (negative reference) developed no nodule whatsoever.

After the nature of the invention has been described and specified, as well as the form of putting the invention into practice, it is claimed as covered by proprietary and title rights:

1. An aqueous-base inoculant composition for leguminous seeds characterized in that the composition comprises
   at least one species of microorganism having a beneficial effect over the plants that will grow from the seeds,
   a molybdenum compound, a polymer selected from the group that presents an amide, amine or imine moiety and
   suitable excipients,
   wherein the inoculant maintains the viability of the microorganism contained therein for up to two years when stored at room temperature.

2. A composition as set forth in claim 1, characterized in that the microorganisms are selected from those of the Rhizobium or Bradyrhizobium genus.

3. A composition as set forth in claim 2, characterized in that the microorganisms are a strain selected from the group formed by *Bradyrhizobium japonicum, Rhizobium meliloti, Rhizobium leguminosarum biovar trifolii, Rhizobium leguminosarum biovar viceae* and *Rhizobium leguminosarum biovar phaseoli*.

4. A composition as set forth in claim 1, characterized in that said molybdenum compound is selected from alkali metal molybdates in a concentration ranging from 0.01 to 2.0% weight/weight of the composition.

5. A composition as set forth in claim 4, characterized in that said molybdenum compound is a potassium molybdate.

6. A composition as set forth in claim 1, characterized in that the polymer is selected from polyvinyl pirrolidone, alkylated vinyl pirrolidone polymers, vinyl pirrolidone and vinyl acetate copolymers, vinyl pirrolidone and styrene copolymers, in a concentration of about 0.2 and 5.0% weight/weight of the composition.

7. An aqueous-based inoculant composition as set forth in claim 1, characterized in that it comprises a strain of *B. japonicum* in an amount effective to promote nitrogen fixation in plants that will grow from soybean seeds, 0.01 to 2.0% weight/weight of potassium molybdate, 0.2 to 5.0% weight/weight of polyvinyl pirrolidone and suitable excipients.

8. A coated seed characterized in that the coating comprises a composition according to any of claims 1 to 7.

9. A method for storing at room temperature an inoculating composition of viable microorganisms as set forth in claim 1, characterized in that it comprises the following stages:
   selecting a culture of viable cells of the Rhizobium or Bradyrhizobium genus,
   mixing said culture with a water solution of about 0.01 to 2.0% weight/weight of a molybdenum compound, about 0.2 to 5.0% weight/weight of a polymer selected from those presenting an amide, amine or imine moiety and suitable excipients; and
   storing the composition at room temperature, ready for use.

* * * * *

UNITED STATES PATENT AND TRADEMARK OFFICE
CERTIFICATE OF CORRECTION

PATENT NO. : 6,606,822 B2
DATED : August 19, 2003
INVENTOR(S) : Bonfiglio

It is certified that error appears in the above-identified patent and that said Letters Patent is hereby corrected as shown below:

<u>Column 7,</u>
Table 3, under heading "Aqueous Inoculant with $PVP/MoO_4=$"for "Seed counting (bacteria/seed)" change "$1.54 \times 10^5$" to -- $1.54 \times 10^6$ --

Signed and Sealed this

Twentieth Day of April, 2004

JON W. DUDAS
*Acting Director of the United States Patent and Trademark Office*